G. VERBER.
ASH SIFTER.
APPLICATION FILED SEPT. 20, 1913.

1,101,977.

Patented June 30, 1914.
2 SHEETS—SHEET 1.

Witnesses:
H. J. Bull
B. J. Richards

Inventor:
George Verber
By Joshua R. H. Potts
His Attorney

G. VERBER.
ASH SIFTER.
APPLICATION FILED SEPT. 20, 1913.

1,101,977.

Patented June 30, 1914.
2 SHEETS—SHEET 2.

Witnesses:
H. E. Bull
B. J. Richards

Inventor
George Verber
By Joshua R. H. Potts
His Attorney

UNITED STATES PATENT OFFICE.

GEORGE VERBER, OF CHICAGO, ILLINOIS.

ASH-SIFTER.

1,101,977. Specification of Letters Patent. Patented June 30, 1914.

Application filed September 20, 1913. Serial No. 790,930.

*To all whom it may concern:*

Be it known that I, GEORGE VERBER, a citizen of the United States, and a resident of the city of Chicago, county of Cook, and State of Illinois, have invented certain new and useful Improvements in Ash-Sifters, of which the following is a specification.

My invention relates to improvements in ash sifters and has for its object the provision of an improved ash sifter which is of simple construction and efficient in operation.

A further object of the invention is the provision of an ash sifter which may be readily used in conjunction with ash pans of different sizes.

With these objects in view my invention consists in the combinations and arrangements of parts hereinafter described and claimed.

Figure 1:
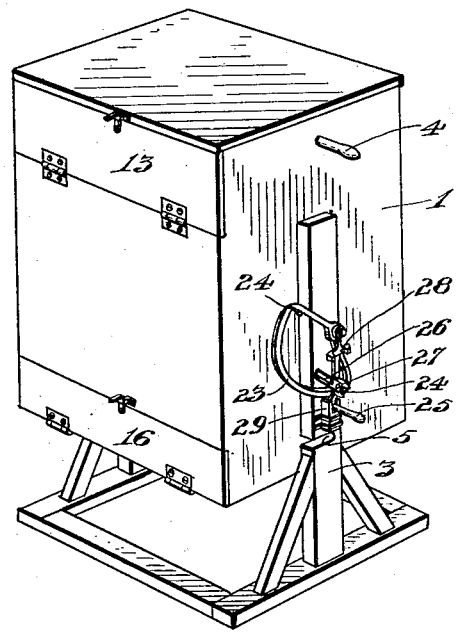
Figure 2:
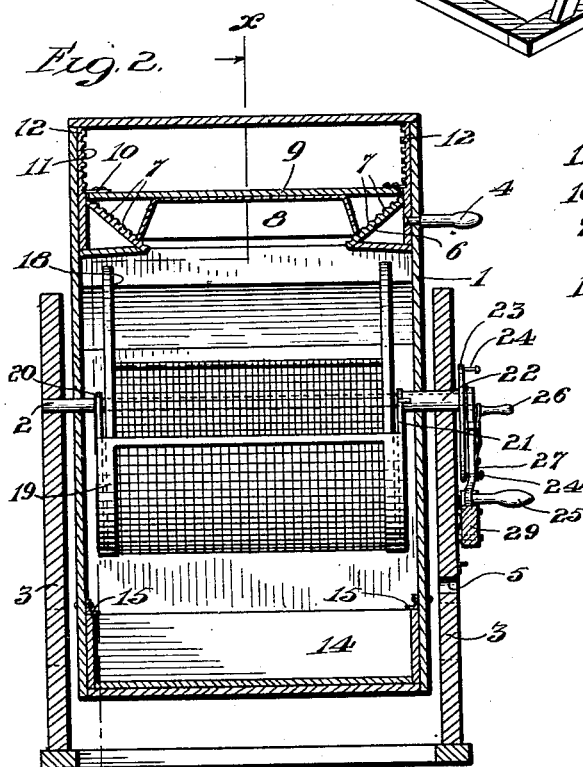
Figure 3:
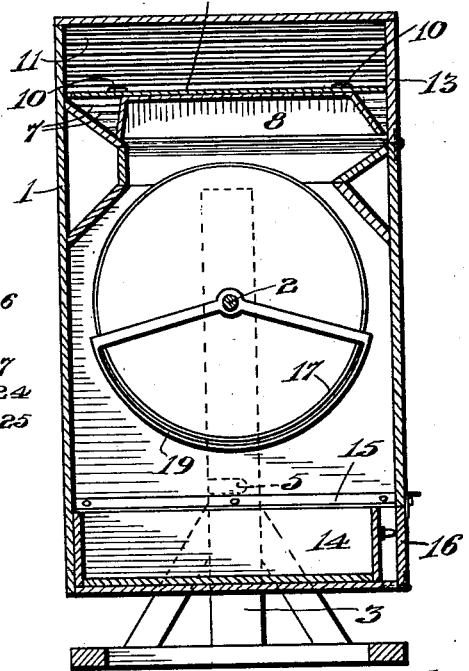
Figure 4:
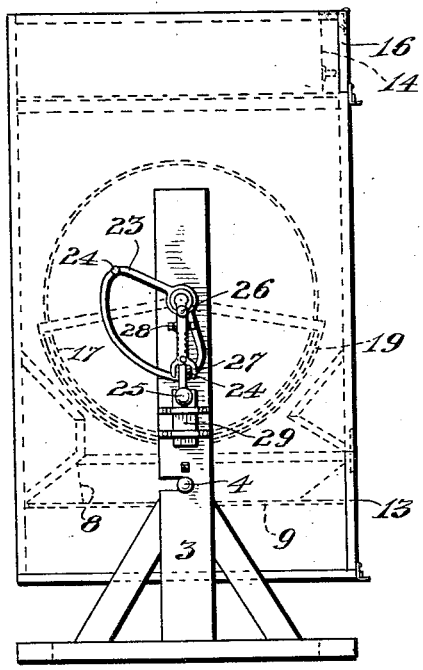
Figure 5:
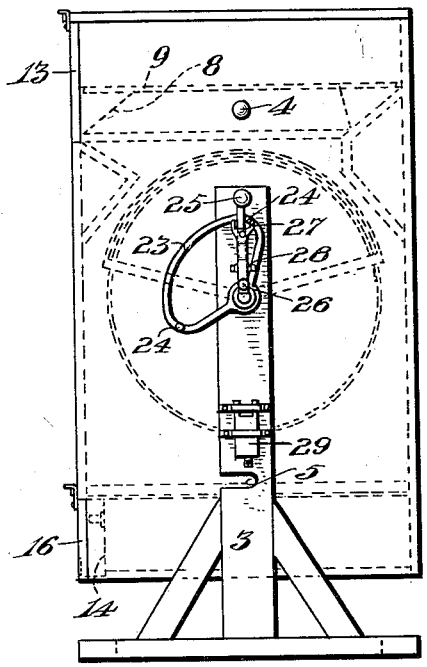
Figure 7:
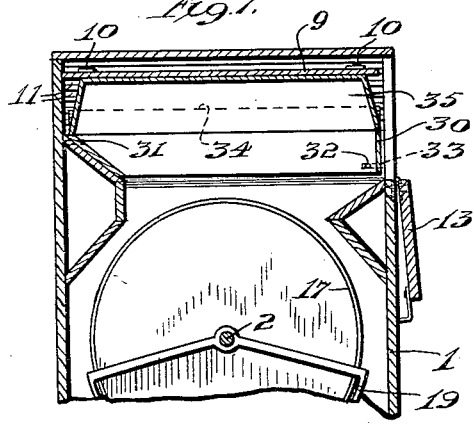
Figure 6:
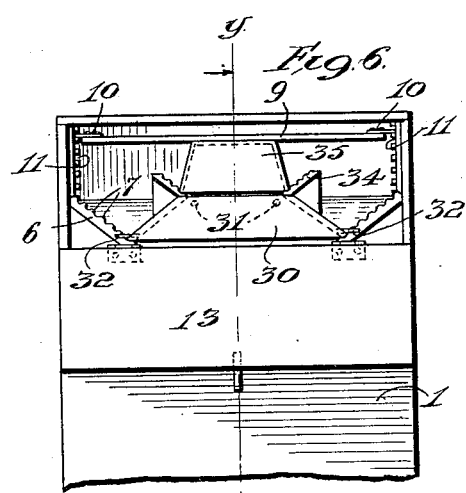

The invention will be best understood by reference to the accompanying drawings forming a part of this specification, and in which, Figure 1 is a perspective view of an ash sifter embodying my invention, Fig. 2, a transverse section of said sifter, Fig. 3 a section taken on line $x-x$ of Fig. 2, Fig. 4, a side elevation of the sifter showing the parts in one position of use, Fig. 5, a similar elevation showing the parts in a different position of use, Fig. 6, an elevation illustrating the use of the sifter in conjunction with a long narrow ash pan, and Fig. 7, a section taken on line $y-y$ of Fig. 6.

The preferred form of construction as illustrated in the drawings comprises a suitable casing 1 which is mounted to rotate loosely on a supporting shaft 2 mounted to rotate in suitable standards 3. Casing 1 is provided with an operating handle 4 by means of which the same may be oscillated on shaft 2, one of the standards 3 being provided with a notch 5 for the accommodation of handle 4 so as to permit of turning casing 1 up side down, as indicated in Fig. 4.

Arranged in the upper portion of casing 1, when in the position shown in Fig. 2, is a pair of upwardly and outwardly flaring supporting walls 6 provided with longitudinal ribs or corrugations 7 for supporting the edges of ash pan 8, said ribs being adapted to engage the edges of ash pans of different sizes, as will be readily understood.

A positioning platform 9 is arranged in casing 1 and serves in conjunction with supporting members 6, to hold an ash pan securely in position. Said supporting member 9 is provided at its sides with supporting plates 10 which fit within grooves 11 provided in supporting pieces 12, as shown. A suitable swinging door or closure 13 gives access to casing 1 for the insertion of an ash pan and the positioning of supporting member 9. By this arrangement, it will be observed, that supporting members 6 will provide for ash pans of different widths and supporting member 9 can be adjusted for ash pans of different depths.

Arranged in the lower portion of casing 1, as shown in Fig. 2, is a removable ash receptacle 14 which has its upper edges resting beneath supporting flanges 15, casing 1 being provided with a swinging door 16 giving access to said casing for the insertion or removal of receptacle 14. By this arrangement, it will be observed that receptacle 14 may be readily removed from or inserted in said casing and that said receptacle will be rigidly supported in said casing during reversals of the same.

A foraminated cylindrical ash receptacle 17 is fixed on shaft 2 within casing 1 as shown, and is provided with an opening 18 for the admission or discharge of ashes thereto or therefrom. A foraminated closure 19 is mounted upon arms 20 and 21 which in turn are mounted to oscillate relatively to shaft 2 and permit of the swinging of said closure to and from closing position for opening 18. Arm 21 is fixed to a sleeve 22 which is passed through one side of casing 1 and the corresponding standard 3 as shown. At its outer end sleeve 22 carries a segmental frame 23 having stop pins 24 at opposite sides thereof. A crank handle 25 is secured to the outer end of shaft 2 adjacent member 23 and serves to rotate ash sifter 17 when desired. Crank handle 25 carries a spring held locking member 26 which is pivoted thereto and provided at one end with jaws 27 adapted to engage pins 24 and at its other end with a spring handle adapted to engage notch 28 formed on crank handle 25. A slidable locking jaw 29 is secured to the corresponding standard 3 and is adapted to engage crank handle 25 to lock said crank handle in the position indicated in Figs. 2 and 4, with the opening 18 in the sifter 17 positioned at the top thereof. By this arrangement, it will be observed that sifter 17 may be readily locked in the position indicated in Fig. 2 and that segmental member 23 may be readily rotated with reference to crank handle 25 to open or close closure 19.

In order to adapt the construction for use with ash pans which are long and narrow such as are used in kitchen ranges, I provide a supplemental supporting member 30 which is provided at its inner end with locking pins 31 adapted to engage suitable sockets in the inner rear wall of casing 1, and at its outer end with locking pins 32 adapted to engage suitable notches 33 in supporting members 6 as shown. Supporting member 30 is provided with upwardly and outwardly flaring ribbed supporting walls 34 adapted to receive the edges of a long and narrow ash pan 35, supporting member 9 being employed to support the bottom of said pan as before. By this arrangement it will be observed, that long and narrow ash pans may be readily inserted in position.

In use ash receptacle 14 is placed in position and the casing reversed until supporting members 6 and 9 are positioned at the bottom thereof. Then an ash pan is inserted through door 13, right side up, and is supported upon supporting member 9 with its upper edges in contact with supporting members 6. Sifting member 17 is moved to the position indicated in Figs. 2 and 4 and locked in that position by means of locking jaw 29 as explained above. Then casing 1 is reversed in position elevating the ash pan to the top thereof and above sifting member 17, whereupon the ashes therein will be deposited in said sifting member, as will be readily understood. Then closure 19 is shifted to closed position and sifter 17 rotated by means of crank handle 25 as explained above. This will result in the deposit of the fine ashes in ash receptacle 14 and the retention of the cinders in sifter 17. The receptacle 14 is then removed, the fine ashes dumped therefrom and the receptacle replaced in position. Then receptacle 1 is reversed bringing the ash pan 8 below sifting member 17, closure 19 opened and sifter 17 reversed in position thus dumping the cinders into ash pan 8 whence they may be readily removed. When long and narrow ash pans, such as are in use in kitchen ranges are used in conjunction with the construction, the supplemental supporting member 30 is adjusted to position as explained above. This permits of the positioning of such an ash pan in operative relation with the sifter, whereupon the ashes may be readily sifted as before.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. An ash sifter comprising a support; a casing mounted on said support and arranged to be reversed in position therein; an ash pan support in one end of said casing; an ashes receptacle in the other end of said casing; and sifting means in said casing between said ash pan support and said ashes receptacle, substantially as described.

2. An ash sifter comprising a support; a casing rotatably mounted on said support and arranged to be reversed in position therein; an ash pan support in one end of said casing; an ashes receptacle in the other end of said casing; and sifting means in said casing between said ash pan support and said ashes receptacle, substantially as described.

3. An ash sifter comprising a support; a casing mounted on said support arranged to be reversed in position therein; an ash pan support in one end of said casing; a removable ashes receptacle in the other end of said casing; and sifting means in said casing between said ash pan support and said ashes receptacle, substantially as described.

4. An ash sifter comprising a reversible casing; sifting means in said casing; a removable closure for said sifting means; an ash pan support in one end of said casing; and an ashes receptacle in the other end of said casing, substantially as described.

5. An ash sifter comprising a reversible casing; rotatable sifting means in said casing; a removable closure for said sifting means; an ash pan support in one end of said casing; and an ashes receptacle in the other end of said casing, substantially as described.

6. An ash sifter comprising a reversible casing; sifting means in said casing; an adjustable ash pan support in one end of said casing; and a removable ashes receptacle in the other end of said casing, substantially as described.

7. An ash sifter comprising a reversible casing; rotatable sifting means in said casing; a removable closure for said sifting means; an adjustable ash pan support in one end of said casing; and a removable ashes receptacle in the other end of said casing, substantially as described.

8. An ash sifter comprising standards; a shaft mounted in said standards; a casing rotatably mounted on said shaft; a cylindrical sifter fixed to said shaft within said casing; a segmental closure for said sifter mounted to revolve about said shaft; a sleeve surrounding said shaft, secured to said closure and extending through a side of said casing and the corresponding standard; means for rotating said shaft and said sleeve independently of and in unison with each other; an ash pan support in one end of said casing; and an ash receptacle in the other end of said casing, substantially as described.

9. An ash sifter comprising standards; a shaft mounted in said standards; a casing rotatably mounted on said shaft; a cylindrical sifter fixed to said shaft within said casing; a segmental closure for said sifter mounted to revolve about said shaft; a sleeve surrounding said shaft, secured to said closure and extending through a side of said casing and the corresponding standard; a crank handle on said shaft; a segmental member on said sleeve; means for locking said crank handle and sleeve together with said closure in either open or closed position; means for locking said crank handle against rotation; an ash pan support in one end of said casing; and an ash receptacle in the other end of said casing, substantially as described.

10. An ash sifter comprising standards; a shaft mounted in said standards; a casing rotatably mounted on said shaft; a cylindrical sifter fixed to said shaft within said casing; a segmental closure for said sifter mounted to revolve about said shaft; a sleeve surrounding said shaft, secured to said closure and extending through a side of said casing and the corresponding standard; means for rotating said shaft and said sleeve independently of and in unison with each other; an ash pan support in one end of said casing; and an ash receptacle in the other end of said casing, substantially as described.

11. An ash sifter comprising standards; a shaft mounted in said standards; a casing rotatably mounted on said shaft; a cylindrical sifter fixed to said shaft within said casing; a segmental closure for said sifter mounted to revolve about said shaft; a sleeve surrounding said shaft, secured to said closure and extending through a side of said casing and the corresponding standard; a crank handle on said shaft; a segmental member on said sleeve; means for locking said crank handle and sleeve together with said closure in either open or closed position; means for locking said crank handle against rotation; an ash pan support in one end of said casing; and an ash receptacle in the other end of said casing, substantially as described.

In testimony whereof I have signed my name to this specification in the presence of two subscribing witnsesses.

GEORGE VERBER.

Witnesses:
JOSHUA R. H. POTTS,
THOMAS W. COLSON.

Copies of this patent may be obtained for five cents each, by addressing the "Commissioner of Patents, Washington, D. C."